and… the United States Patent Office

3,637,898
THERMOPLASTIC POLYESTER MOULDING COMPOSITIONS CONTAINING PHOSPHORUS COMPOUNDS

Walter Herwig, Frankfurt am Main, and Rudolf Uebe, Hofheim, Taunus, Germany, assignors to Farbwerke Hoechst Aktiengesellschaft vormals Meister Lucius & Bruning, Frankfurt am Main, Germany
No Drawing. Filed June 24, 1970, Ser. No. 49,565
Claims priority, application Germany, July 10, 1969, P 19 34 903.2
Int. Cl. C08g 39/04
U.S. Cl. 260—75 P
9 Claims

ABSTRACT OF THE DISCLOSURE

Thermoplastic compositions having excellent injection moulding properties are obtained from linear saturated polyesters and alkali metal salts of organic phosphonic acids, the monoesters thereof, of organic phosphonous acids or of organic phosphinic acids, the organic radicals being saturated or unsaturated alkyl, cycloalkyl, aryl, or aralykyl groups having up to 15 carbon atoms.

---

The present invention relates to thermoplastic moulding compositions on the basis of polyesters having improved properties.

It has been proposed to process polyesters of aromatic dicarboxylic acids and aliphatic or cycloaliphatic diols by injection moulding. Owing to their excellent mechanical properties injection moulded articles made from moulding compositions on the basis of polyethylene terephthalate are used for technical purposes.

Besides heating of the mould at 110–150° C., the addition of effective crystallization accelerators to the polyester mass is of decisive importance in injection moulding. It is only in this manner that the moulder articles obtained acquire the high degree of crystallinity required for practical use and thus hardness and dimensional stability. Injection moulded articles of non-modified polyethylene terephthalate have an insufficient dimensional stability, above all at temperatures above the second order transition temperature, as their density increases owing to after-crystallization. Moreover, it is desirable to obtain the high degree of crystallinity in as short a period of time as possible so that a short residence time in the mould is sufficient and a high production rate can be obtained.

In British Pat. 1,104,089 it has been proposed to use finely divided inorganic substances as crystallization auxiliaries. Nucleating agents of this kind are, for example, talc, calcium carbonate, titanium dioxide or glass powder, which are the more effective the smaller their particle size. The added substance should be uniformly distributed in the polyester mass without formation of agglomerates. For an economic processing the polyester injection moulding composition should have not only a sufficient crystallization speed but also good mould release properties. When the moulded articles stick to the mould, injection moulding cannot be carried out automatically as the articles must be removed from the mould by hand.

The present invention is based on the observation that thermoplastic moulding compositions consisting of (a) linear saturated polyesters of aromatic dicarboxylic acids and optionally up to 10% by weight of aliphatic dicarboxylic acids with saturated aliphatic or cycloaliphatic diols and (b) 0.005 to 5% by weight, preferably 0.05 to 1.0% by weight, calculated on the polyester, of alkali metal salts, preferably sodium salts, of phosphonic acids $RPO(OH)_2$, the monoesters thereof $RPO(OR')(OH)$, phosphonous acid $RP(OH)_2$, or phosphonic acids $$R_2PO(OH)$$

in which R and R' stand for saturated or unsaturated alkyl, cycloalkyl, aryl or aralkyl groups having up to 15 carbon atoms, preferably 2 to 8 carbon atoms, have excellent injection moulding properties.

The organic phosphorus compounds to be used are prepared according to known methods, as described, for example in Houben-Weyl, volume 12/1 and 2.

The moulding compositions of the invention are distinguished by outstanding properties of crystallization. Injection mouded articles having a high degree of crystallinity and an excellent surface gloss are obtained even after a short dwell time in the mould. The specified phosphonic, phosphonous and phosphonic acid salts have the further advantage that they can be added to the polyester melt during or prior to polycondensation without the polycondensation being disturbed or colorations of the product brought about. In general, good nucleating agents should have a high fineness of grain. A special advantage of the organic alkali metal salts to be used according to the invention resides in the fact that an expensive grinding thereof is unnecessary because the salts are substantially soluble in the polyester melt and can be homogeneously distributed therein. In most cases inorganic nucleating agents do not allow the injection moulded articles to be removed from the mould in a period of time sufficient for an economical processing. Additional mould release auxiliaries must be used. The polyester moulding compositions containing as nucleating agents the phosphorus compounds specified above have improved mould release properties so that it is not necessary to add a mould release agent. Even injection moulded articles having a complicated shape automatically fall out of the mould after a short dwell time.

As linear polyester polyethylene terephthalate is preferably used. It is likewise possible, however, to use other polyesters, for example polycyclohexane-(1,4)-dimethylol terephthalate. Still further, modified polyethylene terephthalates can be used containing in addition to terephthalic acid units, units of other aromatic or aliphatic dicarboxylic acids, for example isophthalic acid, naphthalene-dicarboxylic acids-(1,6) or adipic acid. It is also possible to use modified polyethylene terephthalates containing, as alcoholic component, in addition to ethylene glycol units, units of other aliphatic diols, for example neopentyl glycol or butanediol-(1,4). Polyesters of hydroxycarboxylic acids may also be used. Prior to injection moulding the polyesters should have a reduced specific viscosity of from 0.9 to 1.8 dl./g., measured at 25° C. with a 1% solution of the polyester in a 60:40 mixture of phenol and tetrachloroethane. Especially good results are obtained with polyesters having a reduced specific viscosity of from 1.1 to 1.5 dl./g.

The polyester composition should contain as little moisture as possible, preferably less than 0.01% of water, calculated on the polyester composition.

To keep low the absorption of moisture, the granulated polyester moulding composition may be coated with a coating of an inert hydrophobic substance, for example a paraffin or wax. Such a wax may also improve the flow properties of the composition, i.e. influence the rheological properties. The mould release properties of the injection moulded articles may be further improved by adding special substances to the polyester granules, for example neutral or partially neutralized salts of montan wax or montan wax esters, alkali metal paraffin sulfonates and alkali metal olefin sulfonates.

Suitable crystallization auxiliaries are, for example, the mono- and dialkali metal salts of vinyl-phosphonic acid, styrene-phosphonic acid, ethyl-phosphonic acid, hexyl-phosphonic acid, decylphosphonic acid, dodecyl-phosphonic acid, cyclohexane-phosphonic acid, or 4-methyl-benzene-phosphonic acid.

Further suitable additives are the alkali metal salts of diphenyl-phosphinic acid, dicyclohexyl-phosphinic acid, dibutyl-phosphinic acid, dioctyl-phosphinic acid, didodecyl-phosphinic acid. As semi-esters of the aforesaid acids there may be used the ethyl, butyl, hexyl, or dodecyl esters. Suitable representatives of the class of alkali metal salts of phosphonous acids are, for example, the sodium salt of butyl-phosphonous acid, the sodium salt of octyl-phosphonous acid, the sodium salt of phenyl-phosphonous acid, the sodium salt of p-methylphenyl-phosphonous acid, and the sodium salt of p-hexylphenyl-phosphonous acid.

To improve the impact strength of the polyester compositions, suitable high molecular weight polymers may be added in known manner, for example copolymers of ethylene and vinyl acetate, of ethylene and acrylic acid esters or of butadiene and styrene.

The salts of the phosphonic or phosphinic acids can be added to the polyester in various ways, for example during the manufacture of the polester, during or after polycondensation. Alternatively, the polyester granules or polyester powders can be blended as uniformly as possible with the powered salts, the blend can be melted in an extruder, extruded while cooling and granulated.

Another way of blending the components consists of coating the polyester granules with the salts, for example by rolling the components in a rotary vessel. In this case blending is brought about during processing of the polyester composition into shaped articles by the screw of the injection moulding machine.

All operations must be carried out with the exclusion of moisture in order to prevent the polyester from degradation. The polyester moulding composition should preferably contain less than 0.01% by weight of water. To bring about a rapid crystallization of the injection moulded article, the mould should be heated at a temperature of at least 100° C., temperatures of from 120 to 150° C. being most favorable.

The following examples illustrate the invention, the parts being by weight unless otherwise stated.

EXAMPLE 1

(1.1) A mixture of 1,000 parts of dimethyl terephthalate, 880 parts of ethylene glycol and 0.31 part of manganese acetate were slowly heated at 225° C. with stirring while methanol was distilled off through a column until the ester interchange reaction was terminated. The excess of ethylene glycol was expelled by raising the temperature to 270° C. After adding 2 parts of disodium salt of n-hexyl-phosphonic acid

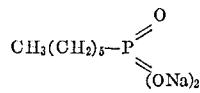

and 0.0348 part of germanium phosphite, polycondensation was effected with increase in temperature to 275° C. and under a final pressure of 0.1 mm. of mercury until the finished polyester had a reduced specific viscosity of 0.8 to 0.9 dl./g. After discharge from the vessel, the polyester was granulated and the granules obtained were subjected to a condensation in the solid state at 235° C. under a pressure of 0.1 to 0.2 mm. of mercury until the reduced specific viscosity (RSV) had risen to 1.45 dl./g.

(1.2) The polyester moulding composition thus obtained was processed into 100 sheets having the dimensions 60 x 60 x 2 mm. under the following moulding conditions: temperature of the cylinder 270°/260°/260° C., temperature of the mould 140° C., injection period 15 seconds, injection pressure 140 atmospheres. The dwell time after which all sheets fell automatically out of the mould was 25 seconds. The injection moulded sheets had a density of 1.370 which did not increase when the dwell time was prolonged to 60 seconds.

EXAMPLE 2

1,000 parts of polyethylene terephthalate in the form of granules having a moisture content of 0.008% by weight and a reduced specific viscosity of 1.55 dl./g. were mixed at room temperature with 2 parts of the sodium salt of diphenyl-phosphinic acid

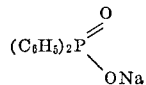

by subjecting the components to a rolling motion for 2 hours. The granules thus coated were homogenized in an extruder at a temperature of 275° C. and the polyester was again granulated. The granules obtained were dried at 180° C. under 0.3 mm. of mercury and sheets having a dimension of 60 x 60 x 2 mm. were produced by injection moulding. The injection moulding conditions were the same as those specified in Example (1.2). With a dwell time of 25 seconds plane sheets having a glossy surface were obtained which all fell from the mould. The sheets still had a density of 1.371 after a dwell time of 60 seconds.

EXAMPLE 3 (COMPARISON)

A polyester was prepared as described in Example 1 with the exception that instead of the disodium salt of n-hexylphosphonic acid, 4 parts of talcum having a particle size of 2 microns were added. The composition ready for injection moulding had a reduced specific viscosity of 1.41 dl./g. It was transformed into sheets under the conditions specified in Example (1.2). Of a total of 100 sheets, only 58 were ejected from the mould, the rest had to be removed by hand. Quite a few of the sheets were not plane and did not show a glossy surface. They had a density of 1.368.

EXAMPLE 4 (COMPARISON)

Polyethylene terephthalate was treated as described in Example 2, with the exception that instead of the sodium salt of the specified phosphinic acid, 4 parts of a silicate were used having the following composition: 32.27% of $SiO_2$, 18.43% of CaO, 17.42% of MgO, 9.11% of $Al_2O_3$, 1.24% of $Na_2O$, 0.36% of $K_2O$, ignition loss 20.05%. The particles of the silicate had been reduced to a size of less than 2 microns. Prior to injection moulding the polyester composition had a reduced specific viscosity (RSV) of 1.44 dl./g. It was processed into sheets under the conditions of Example (1.2). When the heated mould was opened none of the sheets were ejected by the ejector pins. The sticky sheets had to be removed manually.

What is claimed is:
1. Thermoplastic compositions suitable for injection moulding consisting of:
   (a) linear saturated polyesters of aromatic dicarboxylic acids, optionally with up to 10% by weight of aliphatic dicarboxylic acids, with saturated aliphatic or cycloaliphatic diols and
   (b) 0.005 to 5% by weight, calculated on the amount of polyester, of an alkali metal salt of a phosphonic acid $RPO(OH)_2$, a monoester of a phosphonic acid $RPO(OR')OH$, a phosphonous acid $RP(OH)_2$, or a phosphinic acid $R_2PO(OH)$, in which R and R' represent saturated or unsaturated alkyl, cycloalkyl, aryl, or aralkyl radicals having up to 15 carbon atoms.

2. A thermoplastic moulding composition as claimed in claim 1, wherein the linear saturated polyester is polyethylene glycol terephthalate.

3. A thermoplastic moulding composition as claimed in claim 1, wherein the linear saturated polyester is polycyclohexane-(1,4) dimethylol terephthalate.

4. A thermoplastic moulding composition as claimed in claim 1, wherein the polyester, prior to moulding, has a reduced specific viscosity of from 0.9 to 1.8 dl./g., measured at 25° C. with a 1% solution in a 60:40 mixture of phenol and tetrachloroethane.

5. A thermoplastic moulding composition as claimed in claim 1, wherein the alkali metal salt of the organic phosphorus compound is used in an amount of from 0.05 to 1.0% by weight, calculated on the amount of polyester.

6. A thermoplastic moulding composition as claimed in claim 1, containing a sodium salt of an organic phosphorus compound.

7. A thermoplastic moulding composition as claimed in claim 1, wherein the organic radicals of the phosphorus compounds contain 2 to 8 carbon atoms.

8. A thermoplastic moulding composition as claimed in claim 1, consisting of the linear saturated polyester and a compound selected from the group consisting of mono- and di-alkali metal salts of vinyl-phosphonic acid, styrene-phosphonic acid, ethyl-phosphonic acid, hexyl-phosphonic acid, decylphosphonic acid, dodecyl-phosphonic acid, cyclohexane-phosphonic acid, 4-methylbenzene-phosphonic acid, alkali metal salts of diphenyl-phosphinic acid, dicyclohexyl-phosphinic acid, dibutyl-phosphinic acid, dioctyl-phosphinic acid, didodecyl-phosphinic acid, the ethyl, butyl, hexyl and dodecyl esters thereof, the sodium salts of butyl-phosphonous acid, octyl-phosphonous acid, phenyl-phosphonous acid, p-methylphenyl-phosphonous acid and p-hexyl-phenyl-phosphonous acid.

9. Injection moulded articles made from the thermoplastic moulding compositions as claimed in claim 1.

References Cited

UNITED STATES PATENTS

| 3,052,653 | 9/1962 | Iannicelli. |
| 3,055,870 | 9/1962 | McIntyre et al. |
| 3,516,957 | 6/1970 | Gray et al. |

FOREIGN PATENTS

| 1,104,089 | 2/1968 | Great Britain. |

MELVIN GOLDSTEIN, Primary Examiner

U.S. Cl. X.R.

264—328